Figure 1:
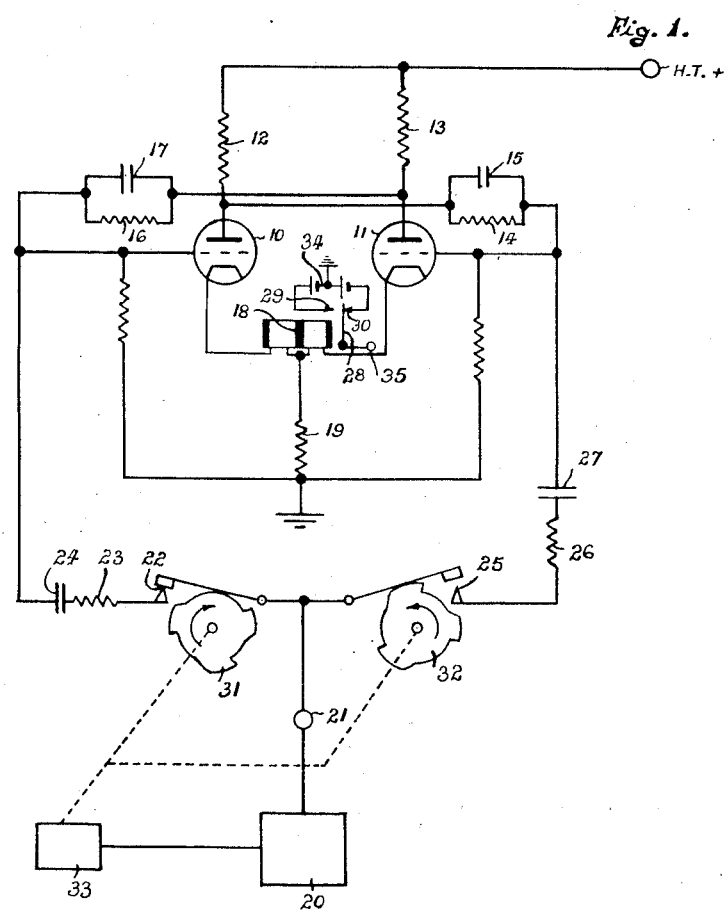

Feb. 12, 1952  R. BEAUFOY  2,585,079
SIGNAL GENERATOR

Filed Sept. 29, 1950  2 SHEETS—SHEET 1

INVENTOR
Raymond Beaufoy
By Ralph B. Stewart
Attorney

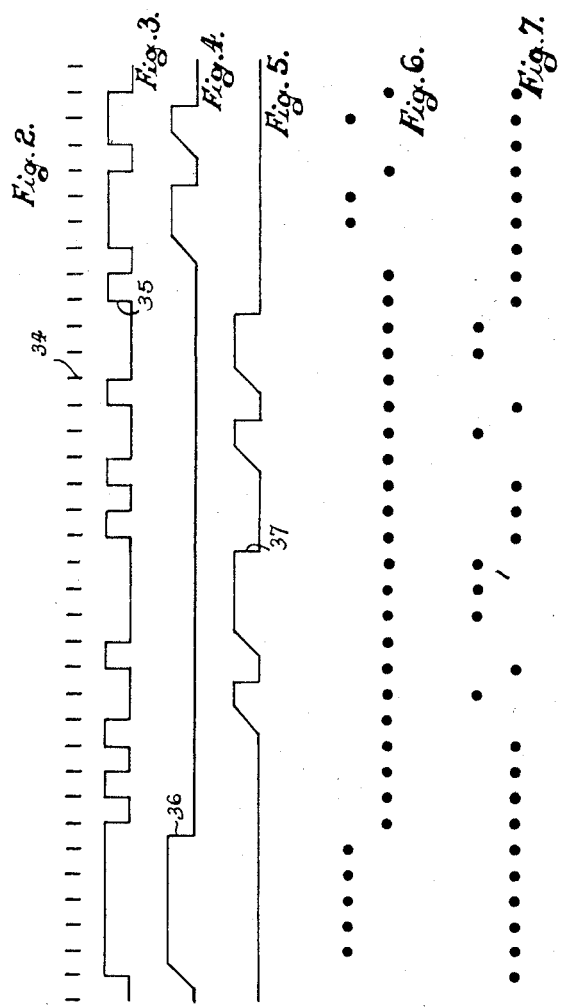

Patented Feb. 12, 1952

2,585,079

UNITED STATES PATENT OFFICE 2,585,079

SIGNAL GENERATOR

Raymond Beaufoy, Taplow, England, assignor to British Telecommunications Research Limited, Taplow, England, a British corporation Application September 29, 1950, Serial No. 187,562
In Great Britain October 12, 1949

3 Claims. (Cl. 178—79)

The present invention relates to signal generators of the type comprising a circuit having two input terminals and adapted to assume one or the other of two stable conditions on the application of a triggering pulse to the input terminals.

A simple generator of this type is commonly known as a "flip-flop" circuit and comprises two triode valves each having an anode load resistor and a direct current connection from the anode of each valve to the control grid of the other. The two input terminals are connected to the control grids of the two valves respectively.

It has been proposed to use a generator of the type specified for generating signals for testing telegraph apparatus. These signals are required to be alternately negative and positive-going and are usually termed "mark" and "space" signals. In transmitting characters by means of teleprinter apparatus, each character is represented by a succession of mark and space signals occupying a standard interval of time, and for convenience this interval is divided into five equal parts. A space signal occupying only one of these parts is referred to as a unit space signal and similarly a mark signal occupying only one of these parts is referred to as a unit mark signal. A character may be represented by a combination of mark and space signals whose durations are integral multiples of unit mark and unit space signals. In addition each signal representing a character is preceded by a "start" signal and is succeeded by a "stop" signal, each of these signals having the duration of a unit mark or space signal. Each character requires therefore for its transmission a time interval equal to seven unit mark or space signals.

In testing telegraph apparatus it is usually convenient to measure distortion in mark or space signals by comparing the instants of occurrence of say the leading and/or trailing edges of the signals with the instants of occurrence of predetermined points in the wave form of a reference oscillation. For example the reference oscillation may be applied to produce a circular trace on the screen of a cathode ray tube and the mark and space signals applied to produce radial deflection of the trace. For testing purposes it is convenient to generate pulses from the reference oscillation and to apply these pulses to a generator of the type specified to generate test signals.

A difficulty arises, however, in that these pulses are regularly recurring, and as has been previously described, mark and space signals may be of different durations although each is an integral multiple of a unit mark or space signal. Various proposals have been made to overcome this difficulty, such as, for example, delaying the application of selected triggering pulses to the circuit of the type specified whereby this circuit is held in one condition or the other for appropriate intervals of time.

It is the object of the present invention to provide an improved signal generator of the type specified suitable for generating under the control of regularly-recurring triggering pulses a predetermined sequence of signals, each signal having a duration equal to an integral multiple of the period of the triggering pulses, but some signals having different durations from others in the sequence.

According to the present invention, in a generator of the type specified the two input terminals are connected to a common input terminal through two pairs of contacts respectively, two cams are provided to open and close the two pairs of contacts respectively, and means are provided for rotating the cams at a speed fixedly related to the recurrence frequency of regularly-recurring triggering pulses applied to the common input terminal.

One embodiment of the invention will now be described, by way of example, with reference to the accompanying drawings in which Figure 1 is a theoretical circuit diagram of the embodiment and Figures 2 to 7 are explanatory diagrams.

The arrangement of Figure 1 comprises a "flip-flop" circuit including two triode valves 10 and 11 having anode load resistors 12 and 13 respectively. The anode of the valve 10 is connected to the control grid of the valve 11 through a resistor 14 shunted by a capacitor 15. Similarly the anode of the valve 11 is connected to the control grid of the valve 10 through a resistor 16 shunted by a capacitor 17. The cathodes of the two valves are connected to the outer terminals of the winding of a differential relay 18 whose centre tap is connected to earth through a resistor 19.

The output of a pulse generator 20, generating positive- or negative-going pulses or positive- and negative-going pulses alternately is applied to an input terminal 21 of the "flip-flop" circuit. In this example it will be assumed that the pulses are positive-going. This terminal is connected through contacts 22, a resistor 23 and capacitor 24 to the control grid of the valve 10, and through contacts 25, a resistor 26, and capacitor 27 to the control grid of the valve 11.

On switching on the "flip-flop" circuit, this circuit takes up one of its two stable conditions. It will be assumed that when this condition prevails the valve 10 is conducting and the valve 11 is non-conducting. If both pairs of contacts 22 and 25 are closed the next pulse applied to the terminal 21 is applied to the grids of both valves simultaneously. This pulse has no effect on the valve 10 whose grid is already highly positive, but causes the valve 11 to become conducting. This lowers the positive potential on the control grid of the valve 10 causing the valve 11 to become more conducting. This action is cumulative and the circuit rapidly assumes its second stable condition in which the valve 10 is non-conducting and the valve 11 is conducting.

The relay 18 is, therefore, energised firstly in one sense and then in the opposite sense. The moving contact 28 of the relay 18 is urged into contact with a fixed contact 29 and then into contact with a fixed contact 30. These contacts are connected to the positive and negative terminals respectively of a battery 34 having a centre-tap connected to earth whereby a positive- and then a negative-going signal is made available at the moving contact 28, which is connected to an output terminal 35. The centre-tap may, of course, be connected to any point of suitable fixed potential.

So long as the contacts 22 and 25 remain closed each pulse applied to the terminal 21 causes a reversal of the polarity of the signal at the moving contact 28. The duration of each of these signals is therefore equal to the period of the applied pulses.

In order to produce signals at the contact 28 having a duration which is two or more times the period of the applied pulses two cams shown diagrammatically at 31 and 32 are provided. These cams are driven from a synchronous motor 33 supplied from the pulse generator 20 by way of an amplifier (not shown).

The cam 31 serves to open and close the contacts 22. When the contacts 22 are open the "flip-flop" circuit assumes the condition in which the valve 11 is conducting and the valve 10 is non-conducting. The cam 32 serves to open and close the contacts 25 and when these contacts are open the "flip-flop" circuit assumes the condition in which the valve 10 is conducting and the valve 11 is non-conducting.

It will be appreciated, therefore, that any desired duration of mark and space signals can be obtained (provided the duration is an integral multiple of the period of the applied pulses) by suitably shaping the contours of the cams 31 and 32.

Referring to Figures 2 to 5, in Figure 2 equally-spaced vertical lines 34 represent pulses generated by the generator 20 in Figure 1, a desired sequence of mark and space signals is shown at 35 in Figure 3, and convenient contours of the cams 31 and 32 respectively of Figure 1 to produce the sequence of mark and space signals shown in Figure 3 are represented in extended form at 36 and 37 in Figures 4 and 5 respectively.

It will be seen from Figures 2 to 5 that in order to produce a mark or space signal of any desired duration which is an integral multiple of the period of the pulses 34 of Figure 2, it is necessary merely to arrange that the appropriate one of the cams 31 and 32 opens its associated contacts after a pulse producing the mark or space condition in the "flip-flop" circuit and before the occurrence of the next succeeding pulse. A generous lead can therefore be used on the cam contours. As shown in Figures 4 and 5 the lead may be equivalent to the interval of time occupied by a unit mark or space signal. Furthermore when unit mark or space signals are to be generated both pairs of contacts 22 and 25 (Figure 1) are closed whereby the total number of raised portions on the cam contours is dependent upon the number of signals to be generated having durations exceeding that of a unit mark or space signal.

Referring to Figures 6 and 7 these illustrate the instants at which the contacts 22 and 25 respectively must be open and closed in order to generate the signals shown in Figure 3. Data are shown in upper and lower positions in each of Figures 6 and 7, the data in the upper positions in Figure 6 indicating when the contacts 22 must be open and the data in the lower position in Figure 6 indicating when the contacts 22 must be closed. Similarly in Figure 7 data in the upper position indicate when the contacts 25 must be open and data in the lower position indicate when the contacts 25 must be closed.

It is clear from Figures 6 and 7 that when cams are used having contours as shown in Figures 4 and 5, that is to say with leads of unit length, satisfactory results are achieved despite errors in the instants of opening or closing of the contacts 22 and 25, up to half a unit time interval (spacing between adjacent pulses 34). It will also be seen that the leads on the cams may be made equivalent to almost two unit time intervals. A lead of unit length as shown in Figures 4 and 5 is preferred but it will be understood that any cam contour which would meet the requirements of Figures 6 and 7 may be employed.

It will be understood that, in operation, contact bounce has no effect on the circuit provided the contacts have reached a steady state before the arrival of the next pulse.

Although the differential relay 18 is shown to have its winding connected in the cathode circuits of the two valves, it will be understood that the relay winding may instead be connected in the anode circuits of the valves. In this case the two outer terminals of the winding 18 may be connected to the upper ends of the two resistors 12 and 13 respectively and the centre-tap on the winding to the terminal HT+. The cathodes of the two valves may then be connected together and to the upper end of the resistor 19.

I claim:

1. A signal generator comprising a source of regularly-recurring pulses, an output terminal for said source, a flip-flop circuit having two input terminals, two pairs of contacts, means connecting one of said pairs of contacts between said output terminal and one of said input terminals, means connecting the other of said pairs of contacts between said output terminal and the other of said input terminals, two cams for opening and closing said two pairs of contacts respectively, and means to rotate said cams at a speed fixedly related to the recurrence frequency of said pulses.

2. A signal generator comprising a source of regularly-recurring pulses, an output terminal for said source, two electron discharge tubes each having an anode, a cathode and at least one control electrode, a direct current coupling between the anode of each of said valves and the said control electrode of the other, two pairs of contacts, means connecting one of said pairs of contacts between said output terminal and the control electrode of one of said tubes, means connecting the other of said pairs of contacts between said output terminal and the control electrode of the other of said tubes, two cams for opening and closing said two pairs of contacts respectively, and means to rotate said cams at a speed fixedly related to the recurrence frequency of said pulses.

3. A signal generator comprising a source of regularly-recurring pulses, an output terminal for said source, two electron discharge tubes each having an anode, a cathode and at least one control electrode, a direct current coupling between the anode of each of said valves and the said control electrode of the other, two pairs of contacts, means connecting one of said pairs of contacts between said output terminal and the control electrode of one of said tubes, means connecting the other of said pairs of contacts between said output terminal and the control electrode of the other of said tubes, two cams for opening and closing said two pairs of contacts respectively, means to rotate said cams at a speed fixedly related to the recurrence frequency of said pulses, a differential relay having two windings, means connecting one of said windings in series with one of said tubes, and means connecting the other of said windings in series with the other of said tubes.

RAYMOND BEAUFOY.

REFERENCES CITED

The following references are of record in the file of this patent:

UNITED STATES PATENTS

| Number | Name | Date |
| --- | --- | --- |
| 1,932,190 | Saunders | Oct. 24, 1923 |
| 1,957,672 | Saunders | May 8, 1934 |